(12) United States Patent
Engerman

(10) Patent No.: US 9,539,957 B2
(45) Date of Patent: Jan. 10, 2017

(54) VEHICLE TOOL BOX ASSEMBLY

(71) Applicant: Nissan North America, Inc., Franklin, TN (US)

(72) Inventor: Eric Engerman, Northville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 20 days.

(21) Appl. No.: 14/669,594

(22) Filed: Mar. 26, 2015

(65) Prior Publication Data

US 2016/0280151 A1    Sep. 29, 2016

(51) Int. Cl.
| B60R 11/06 | (2006.01) |
| B25H 3/02 | (2006.01) |
| B25H 5/00 | (2006.01) |
| B62D 43/10 | (2006.01) |

(52) U.S. Cl.
CPC .............. *B60R 11/06* (2013.01); *B25H 3/02* (2013.01); *B25H 5/00* (2013.01); *B62D 43/10* (2013.01)

(58) Field of Classification Search
CPC ........... B60R 11/06; B25H 5/00; B62D 43/00; B62D 43/06; B62D 43/08; B62D 43/10
USPC ...... 296/37.2, 37.3; 224/42.12, 42.13, 42.14, 224/42.19, 42.2, 42.23, 42.24, 542, 544
See application file for complete search history.

(56) References Cited

U.S. PATENT DOCUMENTS

| 1,684,699 | A | * | 9/1928 | Harsin | ..................... | B60R 11/06 |
| | | | | | | 206/304 |
| 1,715,719 | A | * | 6/1929 | Shelton | .................. | B60R 11/06 |
| | | | | | | 224/42.14 |
| 3,513,969 | A | | 5/1970 | Roff | | |
| 5,429,285 | A | * | 7/1995 | Kim | ....................... | B62D 43/10 |
| | | | | | | 206/373 |
| 5,586,698 | A | * | 12/1996 | Satoh | ..................... | B62D 43/10 |
| | | | | | | 224/42.12 |
| 5,601,206 | A | * | 2/1997 | Haas | ........................ | B60R 9/00 |
| | | | | | | 16/254 |
| 5,799,845 | A | * | 9/1998 | Matsushita | ............... | B60R 5/04 |
| | | | | | | 224/42.14 |
| 5,855,310 | A | * | 1/1999 | Van Ert | ................... | B60R 11/06 |
| | | | | | | 224/275 |
| 6,026,999 | A | * | 2/2000 | Wakefield | ............... | B60R 11/06 |
| | | | | | | 220/4.22 |

(Continued)

OTHER PUBLICATIONS

U.S. Appl. No. 14/502,266; Vehicle Storage Tray Assembly; E Engerman; filed Sep. 30, 2014.

*Primary Examiner* — Justin Larson
*Assistant Examiner* — Scott McNurlen
(74) *Attorney, Agent, or Firm* — Global IP Counselors, LLP

(57) ABSTRACT

A vehicle tool box assembly includes a storage area disposed in a vehicle cargo space and a tool box disposed in the storage area. The tool box includes a body having opposite first and second end walls and an upper surface extending between upper ends of the first and second end walls. A plurality of cut-outs is formed in the upper surface and configured to receive tools. A first lip extends upwardly from the upper surface at the first end wall. A second lip extends upwardly from the upper surface at the second end wall. A cover member is received by the tool box. The cover member includes a first recess received by the first lip and a second recess received by the second lip, thereby substantially preventing movement of the cover member relative to the tool box.

18 Claims, 8 Drawing Sheets

(56) References Cited

U.S. PATENT DOCUMENTS

| | | | |
|---|---|---|---|
| 6,336,671 B1* | 1/2002 | Leonardi | B60R 5/04 224/42.13 |
| 6,739,742 B2 | 5/2004 | Gehring et al. | |
| 7,090,274 B1 | 8/2006 | Khan et al. | |
| 8,808,827 B2 | 8/2014 | Preisler et al. | |
| 2002/0053810 A1* | 5/2002 | Kaluszka | B62D 43/10 296/37.3 |
| 2005/0040191 A1* | 2/2005 | Hwang | B62D 43/10 224/42.14 |
| 2012/0121367 A1* | 5/2012 | Reznar | B62D 43/045 414/463 |
| 2016/0090046 A1* | 3/2016 | Engerman | B60R 5/044 296/37.2 |

* cited by examiner

US 9,539,957 B2

VEHICLE TOOL BOX ASSEMBLY

BACKGROUND

Field of the Invention

The present invention generally relates to a tool box for a vehicle cargo space. More specifically, the present invention relates to a tool box receivable by a spare tire disposed in a vehicle cargo space, and a cover member receivable by the tool box such that the cover member is located to the tool box.

Background Information

Many current vehicles include a storage area in which a spare tire is disposed. A tool box is disposed in the storage area and houses tools used to change a vehicle tire. Existing tool boxes are large and have a large surface area contacting the spare tire. Movement of the tool box relative to the space tire results in noises being generated, such as squeaks or rattles, which can be distracting to a vehicle passenger.

A board can be used to cover the tool box. The board is merely disposed over the tool box with no engagement therebetween, such that properly locating the board to the tool box is difficult. Additionally, noise is generated by movement of the board relative to the tool box, which can be distracting to a vehicle passenger.

SUMMARY

In view of the state of the known technology, one aspect of the present invention includes a tool box for a vehicle cargo space. The tool box has a body having a first end wall, a second end wall disposed opposite the first end wall, an upper surface extending between upper ends of the first and second end walls and a lower surface extending between lower ends of the first and second end walls. A first length from the first end wall to the second end wall is greater than a second length between first and second side walls extending between the first and second end walls. A plurality of cut-outs is formed in the upper surface and configured to receive tools. A first lip extends upwardly from the upper surface at the first end wall. A second lip extends upwardly from the upper surface at the second end wall. First and second projections extend downwardly from the lower surface and are configured to locate to a spare tire disposed in the vehicle cargo space.

Another aspect of the present invention includes a vehicle tool box assembly including a storage area disposed in a vehicle cargo space and a tool box disposed in the storage area. The tool box includes a body having a first end wall, a second end wall disposed opposite the first end wall and an upper surface extending between upper ends of the first and second end walls. A plurality of cut-outs is formed in the upper surface and configured to receive tools. A first lip extends upwardly from the upper surface at the first end wall. A second lip extends upwardly from the upper surface at the second end wall. A cover member is received by the tool box. The cover member includes a first recess received by the first lip and a second recess received by the second lip, thereby substantially preventing movement of the cover member relative to the tool box

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
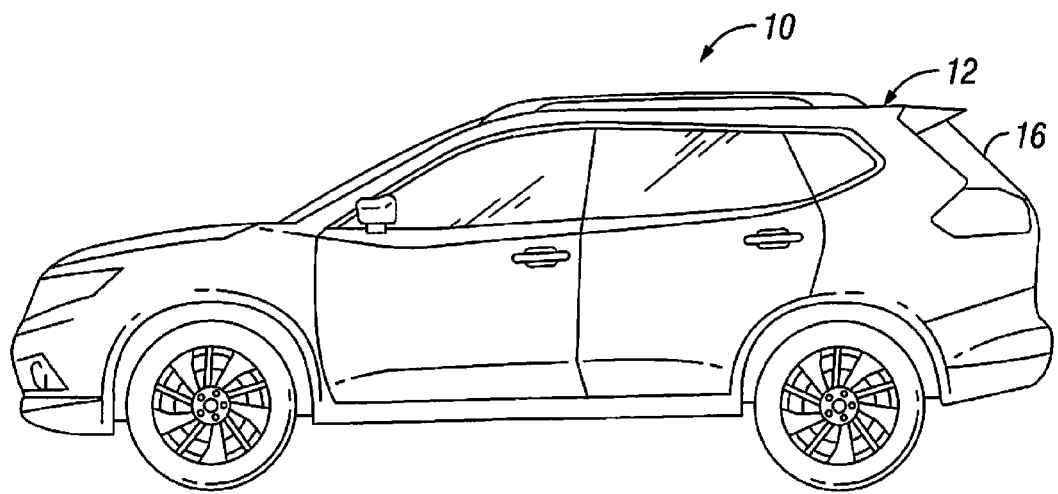
FIG. 1 is a side elevation view of a vehicle.

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Figure 2:
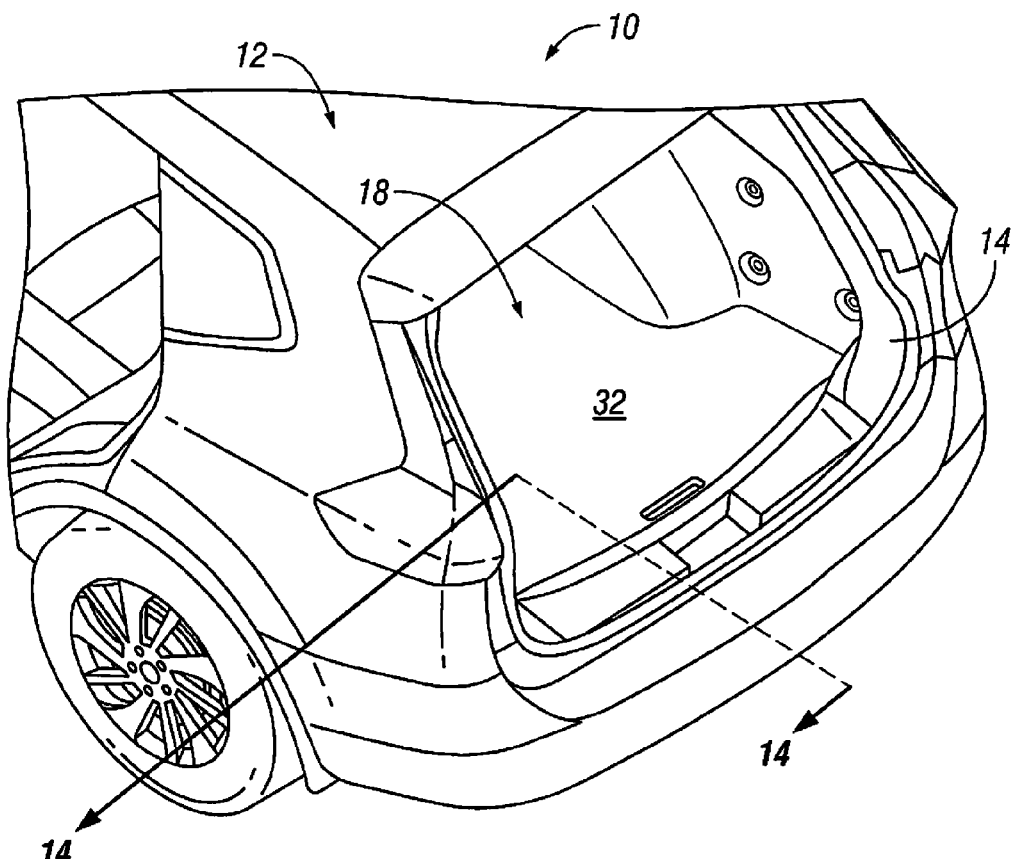
FIG. 2 is a rear perspective view of the vehicle of FIG. 1 with a rear hatch door removed for clarity.
Figure 5:
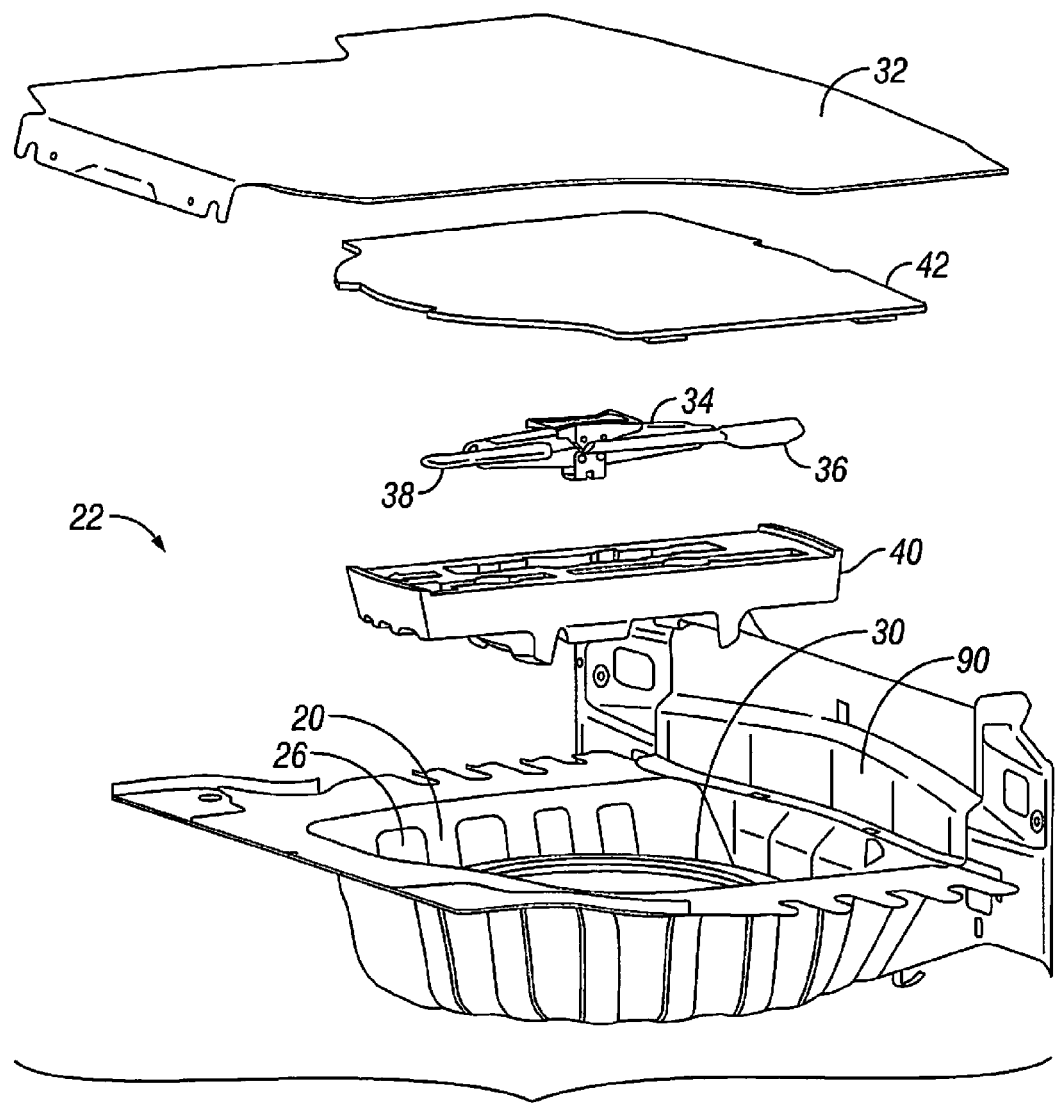
FIG. 5 is an exploded perspective view of the tool box assembly in accordance with an exemplary embodiment of the present invention.

Referring initially to FIGS. 1 and 2, a vehicle 10 is illustrated in accordance with an exemplary embodiment of the present invention. The vehicle 10 includes, among other features, a vehicle body structure 12 with a rear hatch opening 14, a rear hatch door 16, a rear cargo space 18, a concave storage area 20 (FIGS. 3 and 5) and a tool box assembly 22 (FIG. 5). As shown in FIG. 2, the rear hatch opening 14 exposes the rear cargo space 18 with the rear hatch door 16 in an open orientation. The rear hatch door 16 is shown in a closed orientation in FIG. 1, but is completely removed from the vehicle 10 in FIG. 2 to provide a view of the rear cargo space 18 within the vehicle body structure 12.

Figure 3:
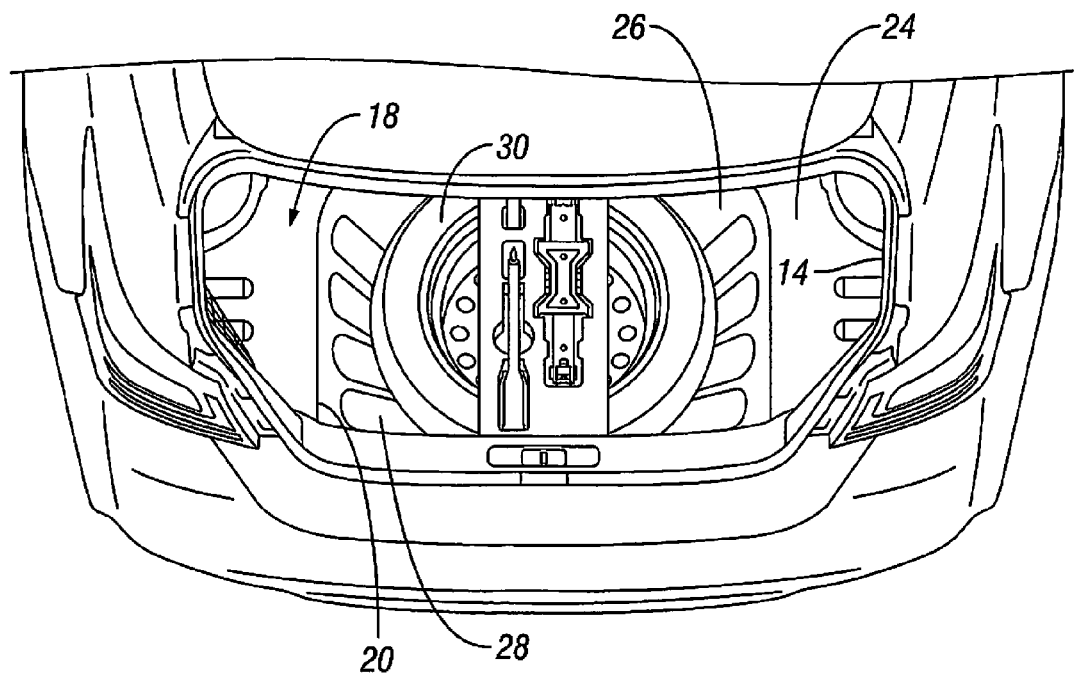
FIG. 3 is a rear perspective of the vehicle of FIG. 1 including a tool box received by a tire disposed in a vehicle cargo space in accordance with an exemplary embodiment of the present invention.

As shown in FIGS. 2 and 3, the rear cargo space 18 includes a deck 24 and the concave storage area 20. The concave storage area 20 has a curved wall portion 26 and a lower deck surface 28 below the deck 24. The curved wall portion 26 extends from the deck 24 to the lower deck surface 28. The concave storage area 20 is dimensioned to receive a spare tire 30 having an inner peripheral edge 31, as shown in FIGS. 3, 5, 9, 14 and 15. Because concave storage areas, such as spare tire storage areas, of vehicles are well known, further description is omitted for the sake of brevity.

The tool box assembly 22 is depicted in FIG. 5 in an unassembled state above the concave storage area 20 and the spare tire 30. The tool box assembly 22 is configured and dimensioned to overlay the spare tire 30 and be received within the concave storage area 20, as shown in FIGS. 3, 9, 14 and 15. The tool box assembly 22 includes a tool box 40 and a cover member 42 received by the tool box 40. The tool box assembly 22 can further include a decorative covering or padded carpet, such as a carpet layer 32, as shown in FIGS. 2, 5, 14 and 15, to cover the concave storage area 20 and the cover member 42.

Figure 6:
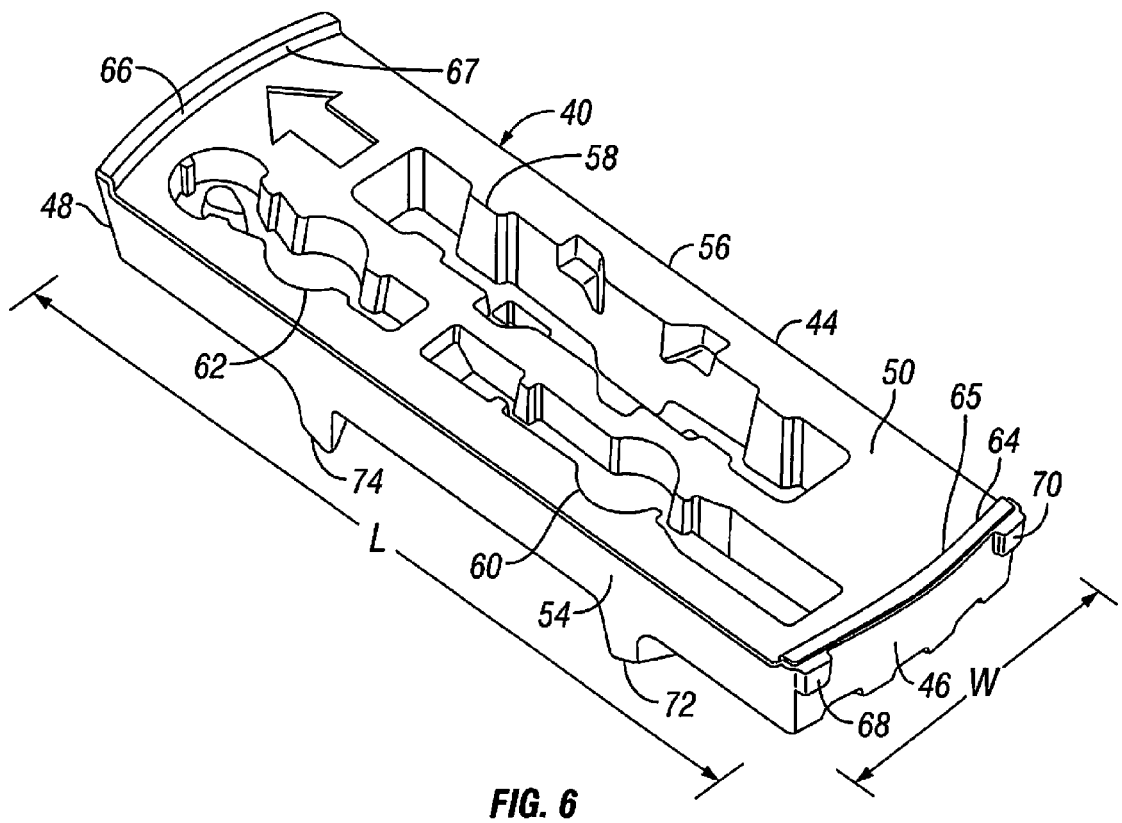
FIG. 6 is a top perspective view of the tool box of FIG. 5.
Figure 7:
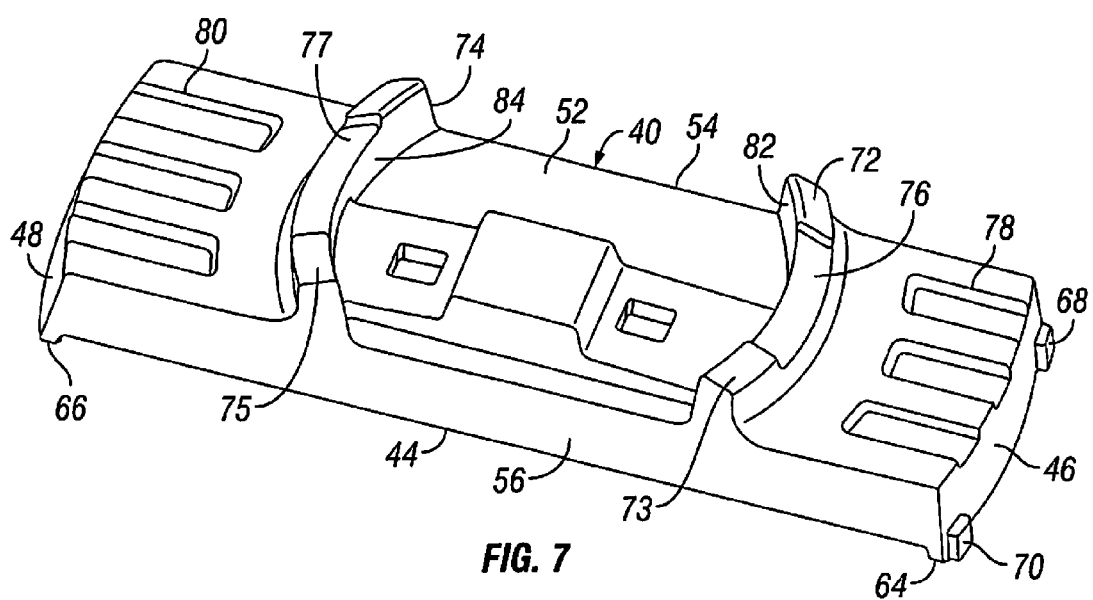
FIG. 7 is a bottom perspective view of the tool box of FIG. 5.
Figure 8:
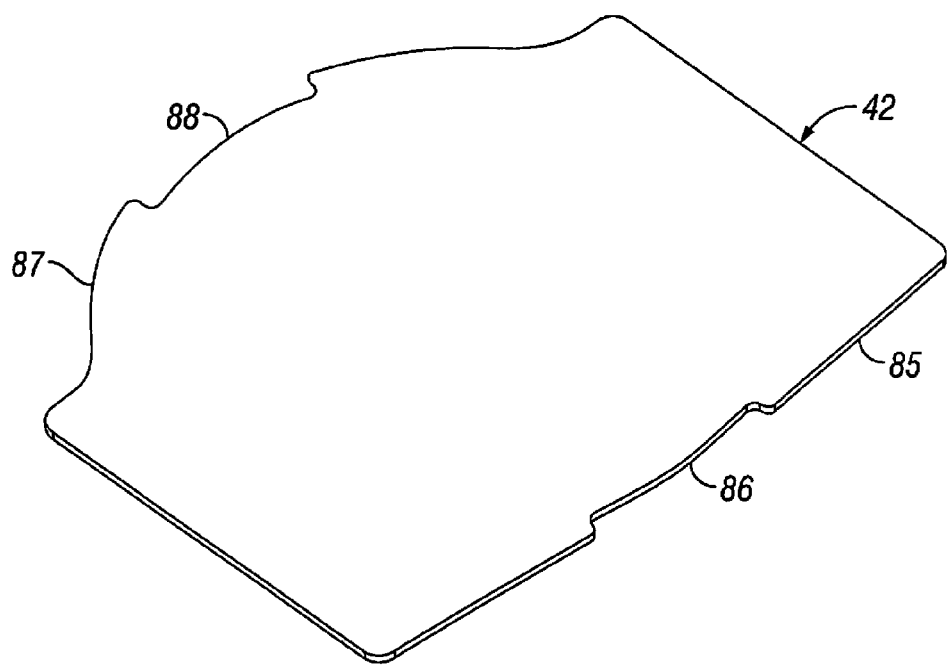
FIG. 8 is a perspective view of the cover member of FIG. 5.

The tool box 40, as shown in FIGS. 6 and 7, has a body 44 having a first end wall 46 and a second end wall 48 disposed opposite the first end wall 46. An upper surface 50 extends between upper ends of the first and second end walls 46 and 48. A lower surface 52 extends between lower ends of the first and second end walls 46 and 48. The upper and lower surfaces 50 and 52 are preferably substantially parallel. A first side wall 54 extends between first sides of the first and second end walls 46 and 48. A second side wall 56 extends between second sides of the first and second end walls 46 and 48. The first and second side walls 54 and 56 are preferably substantially parallel. A length L from the first end wall 46 to the second end wall 48 is preferably greater than a length W from the first side wall 54 to the second side wall 56 such that the tool box body 44 has a generally rectangular shape.

The tool box is configured to receive, retain and store a plurality of tools, such as a jack 34, a lug-nut wrench 36 and a tow hook 38, as shown in FIGS. 3 and 5. A plurality of cut-outs 58, 60 and 62 are formed in the upper surface 50 of the tool box body 44, as shown in FIG. 6. The first cut-out 58 receives the jack 34. The second cut-out 60 receives the lug-nut wrench 36. The third cut-out 62 receives the tow hook 38. Any suitable number and shape of cut-outs can be formed in the tool box body 44 to receive appropriate tools for storage therein.

A first lip 64 extends upwardly from the upper surface 50 at the first end wall 46, as shown in FIGS. 6 and 7. The first lip 64 preferably extends from the first side wall 54 to the second side wall 56. A second lip 66 extends upwardly from the upper surface 50 at the second end wall 48. The second lip 64 preferably extends from the first side wall 54 to the second side wall 56. An inner surface 65 of the first lip 64 faces an inner surface 67 of the second lip 66. The first and second lips 64 and 66 have substantially arcuate shapes. Preferably, the curvature of the first lip 64 is different from the curvature of the second lip 66.

First and second tabs 68 and 70 extend outwardly from the first end wall 46 of the tool box body 44, as shown in FIGS. 6 and 7. The first and second tabs 68 and 70 preferably extend away from the second end wall 48 in a rearward direction of the vehicle 10. The first tab 68 is disposed adjacent the first side wall 54. The second tab 70 is disposed adjacent the second side wall 56.

Figure 9:
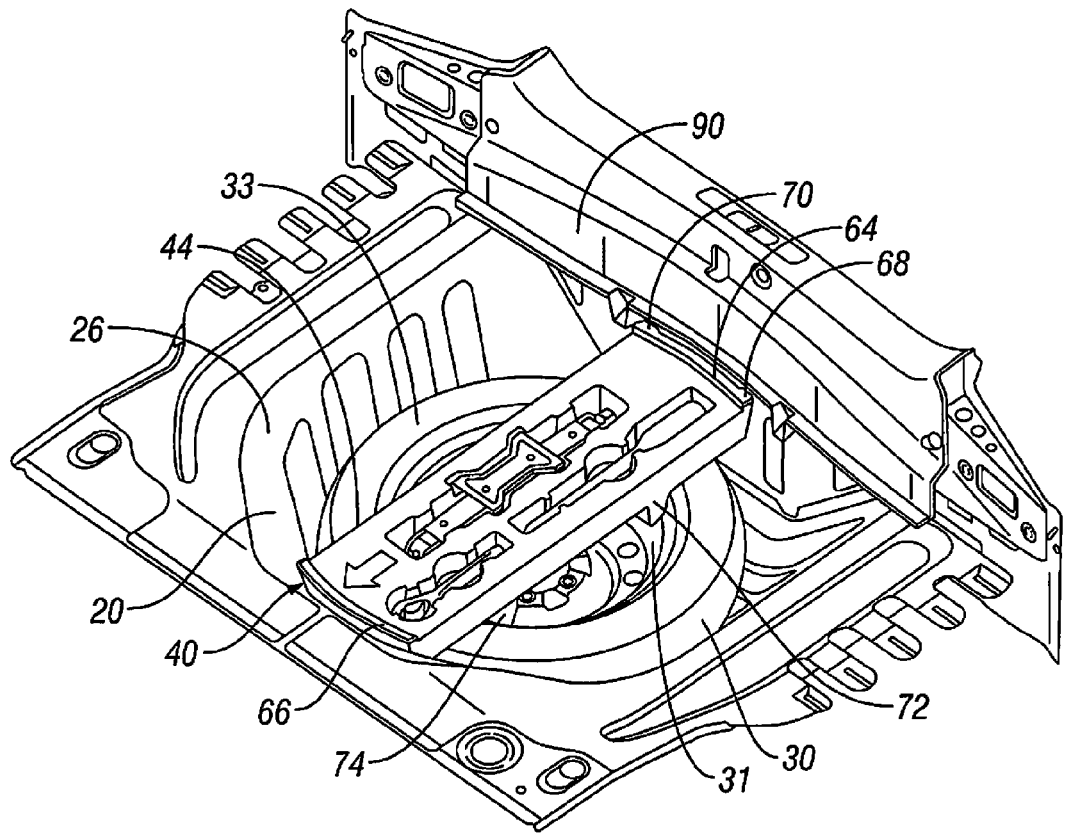
FIG. 9 is a perspective view of the tool box received by the spare tire disposed in the storage area with the vehicle structure removed for clarity.
Figure 14:
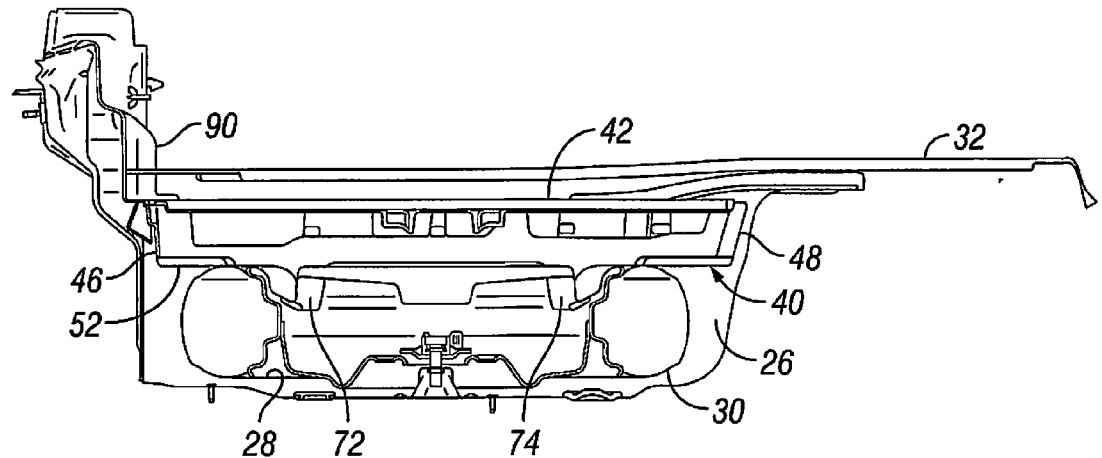
FIG. 14 is a side elevation view in cross-section of the tool box assembly disposed in the cargo space taken along line 11-11 of FIG. 2.
Figure 15:
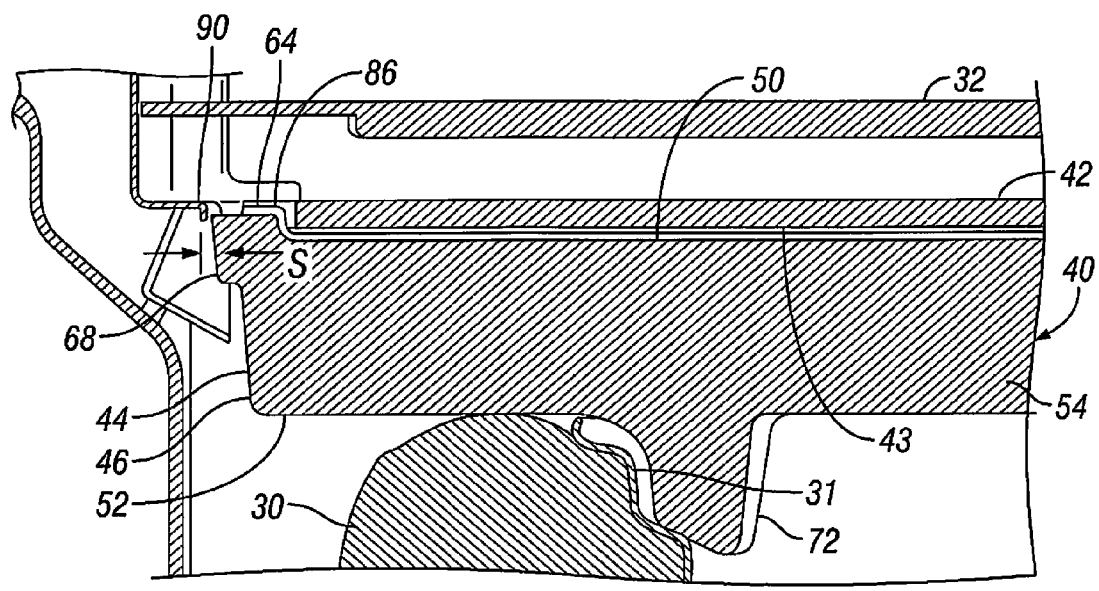
FIG. 15 is an enlarged view of the tool box assembly of FIG. 14.

First and second projections 72 and 74 extend downwardly from the lower surface 52 of the tool box body 44, as shown in FIGS. 6 and 7. The first and second projections 72 and 74 preferably extend from the first side wall 54 to the second side wall 56. The first and second projections 72 and 74 are preferably substantially arcuate and have substantially similar curvatures. The curvatures of the first and second projections 72 and 74 are configured to correspond to the inner peripheral edge 31 of the spare tire 30, as shown in FIGS. 9, 14 and 15. As shown in FIG. 7, lower surfaces 73 and 75 of the first and second projections can have recessed portions 76 and 77 that extend downwardly less than the remaining portions of the lower surfaces 73 and 75. An inner surface 82 of the first projection 72 faces an inner surface 84 of the second projection 74. The lower surfaces 73 and 75 preferably slope downwardly from the inner surfaces 82 and 84 toward the first and second end walls 46 and 48, respectively.

A plurality of first and second recesses 78 and 80 are disposed in the lower surface 52 of the tool box body 44, as shown in FIG. 7. The plurality of first recesses 78 extend from the first end wall 46 toward the second end wall 48. The plurality of second recesses 80 extend from the second end wall 48 toward the first end wall 46. The first and second projections 72 and 74 are preferably disposed between the plurality of first recesses 78 and the plurality of second recesses 80. Each of the plurality of first recesses 78 is spaced apart from others of the plurality of first recesses 78 in a width direction of the tool box body 44. Each of the plurality of second recesses 80 is spaced apart from others of the plurality of second recesses 80 in a width direction of the tool box body 44. As shown in FIG. 7, the tool box 40 has three first recesses 78 and three second recesses 80, although any suitable number of recesses can be used.

The cover member 42 is received by the tool box 40, as shown in FIGS. 10-15. The cover member 42 includes a first recess 86 formed in a first peripheral edge 85 thereof. A second recess 88 is formed in a second peripheral edge 87 substantially opposite the first recess 86. The first recess 86 has a substantially arcuate shape corresponding to the first lip 64 of the tool box 40. The second recess 88 has a substantially arcuate shape corresponding to the second lip 66 of the tool box 40. The cover member 42 is preferably a substantially planar member.

As shown in FIGS. 3, 9, 14 and 15, the tool box 40 is shown received by the spare tire 30 disposed in the storage area 20. The first and second projections 72 and 74 locate the tool box 40 to the spare tire 30. The arcuate shapes of the first and second projections 72 and 74 correspond to the inner peripheral edge 31 of the spare tire 30 to facilitate locating the tool box 40 to the spare tire 30. By receiving the first and second projections 72 and 74, the spare tire 30 substantially prevents non-rotational movement of the tool box 40. The plurality of first and second recesses 78 and 80 reduces the surface area of the tool box body 44 contacting the spare tire 30, thereby minimizing contact between the tool box body 44 and a side wall 33 of the spare tire 30. By minimizing contact between the tool box 40 and the spare tire 30, noises, such as squeaks or rattles, are minimized when the tool box 40 moves relative to the spare tire 30.

Figure 13:
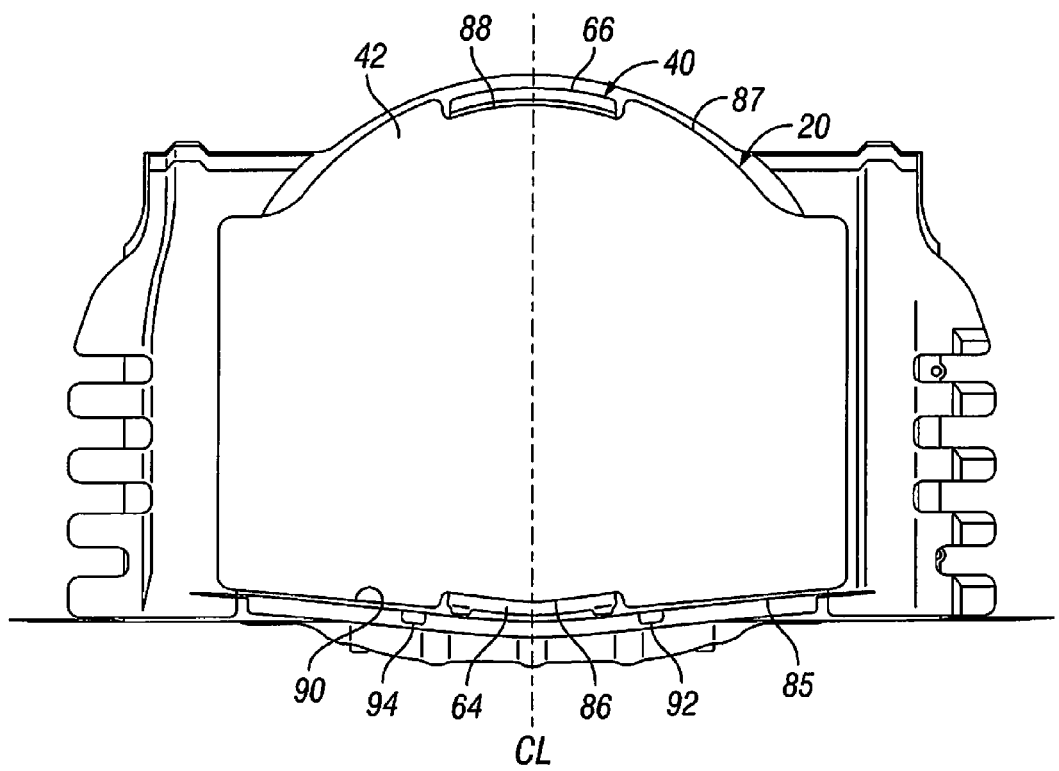
FIG. 13 is a plan view of the installed tool box assembly of FIG. 2 with a carpet layer removed for clarity.

The first and second tabs 68 and 70 maintain a spaced apart relationship with a rear wall 90 of the storage area 20 when the tool box 40 is received by the spare tire 30 to substantially prevent rotational movement of the tool box 40, as shown in FIGS. 13-15. A gap S is maintained between the rear wall 90 and the first and second tabs 68 and 70, as shown in FIG. 15 when the tool box 40 and the cover member 42 are first installed. The contour of the rear wall 90 substantially limits rotation of the tool box 40 relative to a center line CL of the storage area 20, as shown in FIG. 13. The tool box 40 can rotate approximately two degrees clockwise or counter-clockwise relative to the center line CL before one of the first and second tabs 68 and 70 engages the rear wall 90 of the storage area 20, thereby substantially preventing further rotational movement of the tool box in that direction. The rear wall 90 has a contour configured to substantially prevent further rotation of the tool box 40 once the first and second tabs 68 and 70 contact the rear wall 90.

Figure 4:
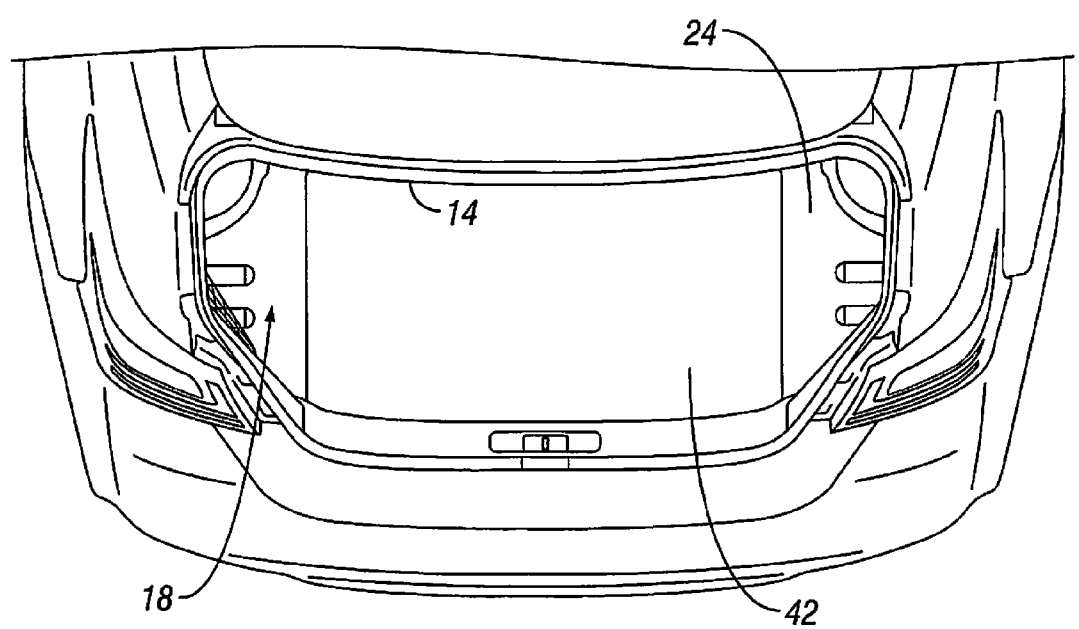
FIG. 4 is a rear perspective view of the rear cargo space of FIG. 3 in which a cover member is received by the tool box.
Figure 11:
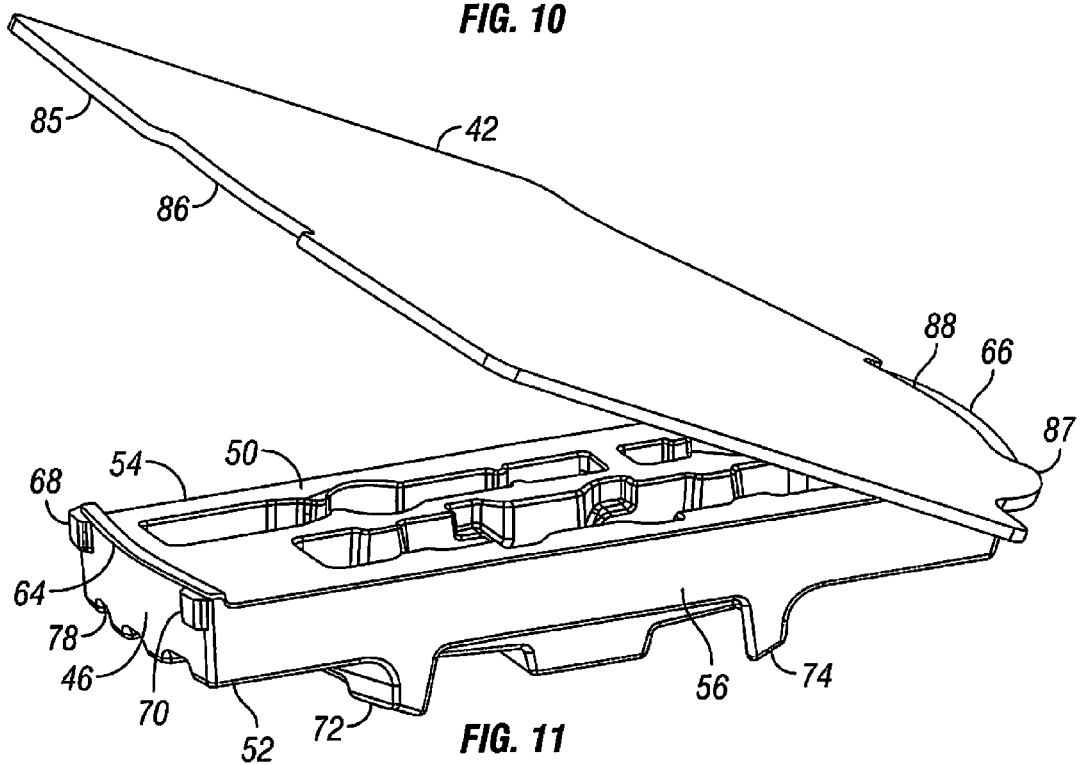
FIG. 11 is a perspective view of the cover member being located to the tool box of FIG. 5.
Figure 12:
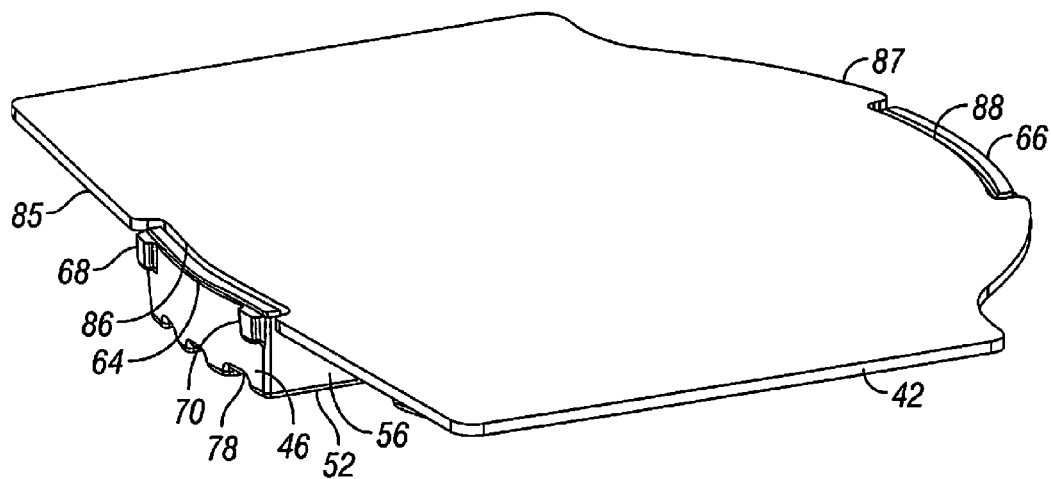
FIG. 12 is a perspective view of the cover member received by the tool box of FIG. 11.

The cover member 42 is then located to the tool box 40, as shown in FIGS. 11 and 12. The second recess 88 in the cover member 42 is engaged with the second lip 66 of the tool box 40, as shown in FIG. 11. The first and second recesses 86 and 88 of the cover member 42 preferably have different shapes, thereby ensuring the cover member is properly oriented with respect to the tool box 40, i.e., the cover member 42 can only be properly installed in one orientation. The cover member 42 is then pivoted downwardly such that the first recess 86 is received by the first lip 64 of the tool box 40, as shown in FIG. 12. By receiving the first and second recesses 86 and 88 of the cover member 42, the first and second lips 64 and 66 substantially prevent movement of the cover member 42 relative to the tool box 40 in addition to locating the cover member 42 to the tool box 40. The cover member 42 extends beyond the first and second side walls of the tool box 40 to substantially cover the storage area 20, as shown in FIG. 4. As shown in FIGS. 14 and 15, a lower surface 43 of the cover member 42 is preferably resting on the upper surface 50 of the tool box body 44.

The first end wall 46 of the tool box 40 is substantially flush with a first peripheral edge 85 of the cover member 42 to define a substantially continuous or uninterrupted edge, as shown in FIG. 13. The second end wall 48 of the tool box 40 is substantially flush with a second peripheral edge 87 of the cover member 42 to define a substantially continuous or uninterrupted edge.

Figure 10:
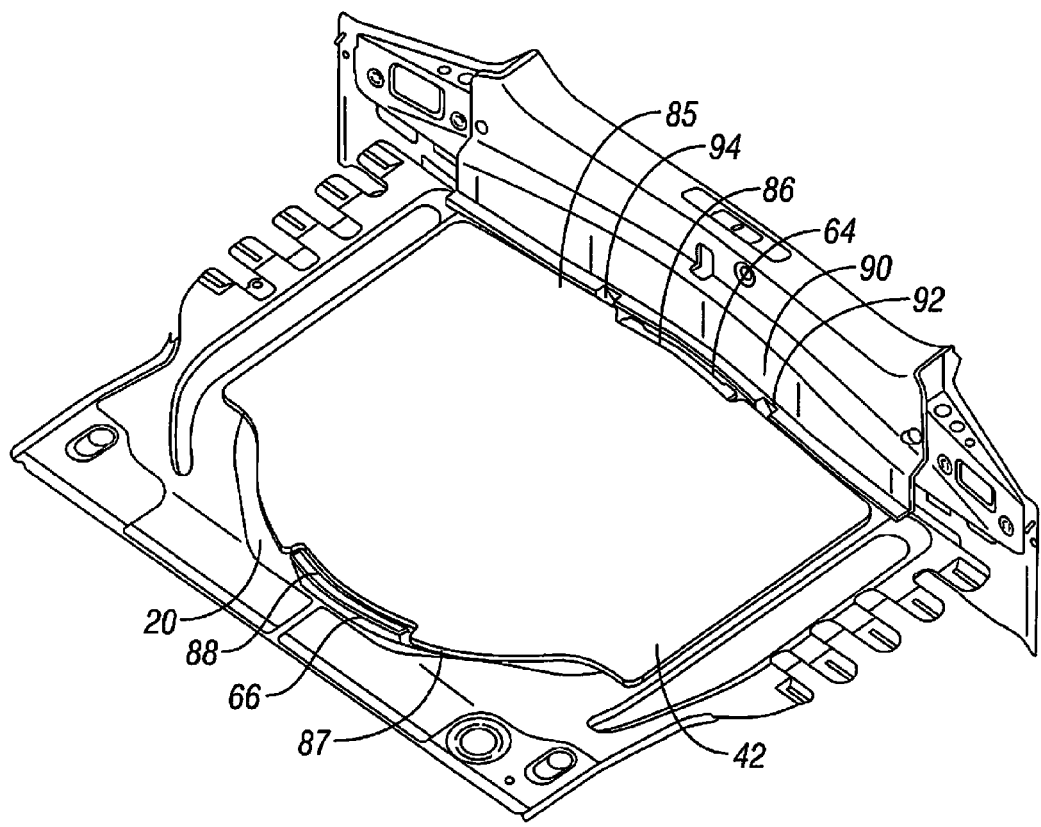
FIG. 10 is a perspective view of the cover member received by the tool box of FIG. 9.

At least one recess 92 is formed in the rear wall of the storage area 20 to facilitate gripping the cover member 42 such that the cover member 42 can be easily removed from tool box 40 in the storage area 20, as shown in FIGS. 10 and 13. Preferably, first and second recesses 92 and 94 are disposed on opposite sides of the storage area center line CL to allow the cover member 42 to be easily removed. The at least one recess 92 is configured to allow a user to insert a finger therein and access the lower surface 43 of the cover member 42 to facilitate removal thereof.

As shown in FIG. 2, the carpet layer 32 can be disposed in the rear cargo space 18 to cover the storage area 20 and the cover member 42. As shown in FIGS. 14 and 15, the carpet member 32 preferably overlies or is slightly space apart from the cover member 42 in a vertical direction. The carpet layer 32 is removed to access the cover member 42 and the tool box 40.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above exemplary embodiment, the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another exemplary embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the exemplary embodiments according to the present invention are provided for illustration only, and not for the purpose of limiting the invention as defined by the appended claims and their equivalents.

What is claimed is:

1. A tool box for a vehicle cargo space, comprising:
   a body having a first end wall, a second end wall disposed opposite the first end wall, an upper surface extending between upper ends of the first and second end walls and a lower surface extending between lower ends of the first and second end walls, a first length from the first end wall to the second end wall being greater than a second length between first and second side walls extending between the first and second end walls;
   a plurality of cut-outs formed in the upper surface configured to receive tools;
   a first lip extending upwardly from the upper surface at the first end wall;
   a second lip extending upwardly from the upper surface at the second end wall;
   first and second projections extending downwardly from the lower surface configured to locate to a spare tire disposed in the vehicle cargo space; and
   first and second tabs extending from the first end wall of the body in a direction away from the second end wall, the first and second tabs being configured to substantially maintain a spaced apart relationship with a wall of the vehicle cargo space when the tool box is received by the spare tire such that contact between the first and second tabs and the wall substantially prevents rotational movement of the body.

2. The tool box according to claim 1, wherein
   the first lip extends from a first side of the upper surface to a second side of the upper surface; and
   the second lip extends from the first side of the upper surface to the second side of the upper surface.

3. The tool box according to claim 1, wherein
   the first and second lips have substantially arcuate-shapes.

4. The tool box according to claim 1, wherein
   the first tab is disposed adjacent the first side and the second tab is disposed adjacent the second side.

5. The tool box according to claim 1, wherein
   a plurality of recesses is defined on the lower surface and is configured to minimize contact between the body and the spare tire when the tool box is received by the spare tire.

6. The tool box according to claim 5, wherein
each of the plurality of recesses is spaced apart from others of the plurality of recesses and extends from the first and second end walls toward the opposite end wall.

7. The tool box according to claim 1, wherein
the first and second projections extend from the first side wall to the second side wall.

8. The tool box according to claim 1, wherein
the first and second projections are substantially arcuate and are configured to correspond to an inner peripheral edge of the spare tire.

9. A vehicle tool box assembly, comprising:
a storage area disposed in a vehicle cargo space;
a tool box disposed in the storage area, the tool box including
a body having a first end wall, a second end wall disposed opposite the first end wall and an upper surface extending between upper ends of the first and second end walls;
a plurality of cut-outs formed in the upper surface configured to receive tools;
a first lip extending upwardly from the upper surface at the first end wall; and
a second lip extending upwardly from the upper surface at the second end wall;
a cover member received by the tool box, the cover member including a first recess received by the first lip and a second recess received by the second lip, thereby substantially preventing movement of the cover member relative to the tool box; and
first and second tabs extending from the first end wall of the tool box in a direction away from the second end wall and substantially maintaining a spaced apart relationship with a wall of the storage area such that contact between the first and second tabs and the wall of the storage area substantially prevents rotational movement of the body.

10. The vehicle tool box assembly according to claim 9, wherein
a first length from the first end wall to the second end wall is greater than a second length between first and second side walls extending between the first and second end walls.

11. The vehicle tool box assembly according to claim 9, wherein
the first and second lips extend from a first side of the upper surface to a second side of the upper surface.

12. The vehicle tool box assembly according to claim 9, wherein
a lower surface extends between lower ends of the first and second end walls; and
a plurality of recesses is defined on the lower surface to minimize contact with a spare tire disposed in the storage area.

13. The vehicle tool box assembly according to claim 12, wherein
each of the plurality of recesses is spaced apart from others of the plurality of recesses and extends from the first and second end walls toward the opposite end wall.

14. The vehicle tool box assembly according to claim 9, wherein
a lower surface extends between lower ends of the first and second end walls; and
first and second projections extend downwardly from the lower surface to locate to a spare tire disposed in the vehicle cargo space, the first and second projections extending from the first side wall to the second side wall.

15. The tool box according to claim 14, wherein
the first and second projections are substantially arcuate and are configured to correspond to an inner peripheral edge of the spare tire.

16. The vehicle tool box assembly according to claim 9, wherein
the first end wall of the tool box is substantially flush with a forward peripheral edge of the cover member to define a substantially continuous edge.

17. The vehicle tool box assembly according to claim 9, wherein
at least one recess is formed in a wall of the storage area to facilitate gripping the cover member.

18. A vehicle tool box assembly, comprising:
a storage area disposed in a vehicle cargo space;
a tool box disposed in the storage area, the tool box including
a body having a first end wall, a second end wall disposed opposite the first end wall and an upper surface extending between upper ends of the first and second end walls;
a plurality of cut-outs formed in the upper surface configured to receive tools;
a first lip extending upwardly from the upper surface at the first end wall; and
a second lip extending upwardly from the upper surface at the second end wall;
a cover member received by the tool box, the cover member including a first recess received by the first lip and a second recess received by the second lip, thereby substantially preventing movement of the cover member relative to the tool box; and
at least one recess formed in a wall of the storage area to facilitate gripping the cover member.

* * * * *